(12) United States Patent
Mahasenan et al.

(10) Patent No.: US 9,473,864 B2
(45) Date of Patent: Oct. 18, 2016

(54) INTERNET PROTOCOL ADDRESSABLE PUBLIC ADDRESS DEVICES AND SYSTEMS

(71) Applicant: Honeywell International Inc., Morristown, NJ (US)

(72) Inventors: Arun Vijayakumari Mahasenan, Trivandrum (IN); Jesse J. Otis, North Haven, CT (US); Santosh M. Mandiganal, Hubli (IN)

(73) Assignee: Honeywell International Inc., Morris Plains, NJ (US)

( * ) Notice: Subject to any disclaimer, the term of this patent is extended or adjusted under 35 U.S.C. 154(b) by 447 days.

(21) Appl. No.: 14/099,702

(22) Filed: Dec. 6, 2013

(65) Prior Publication Data

US 2015/0163609 A1    Jun. 11, 2015

(51) Int. Cl.
| | |
|---|---|
| *G08B 17/00* | (2006.01) |
| *H04R 27/00* | (2006.01) |
| *H04L 12/18* | (2006.01) |
| *G08B 7/06* | (2006.01) |
| *G09G 1/00* | (2006.01) |
| *G08B 1/00* | (2006.01) |
| *G08B 13/16* | (2006.01) |

(52) U.S. Cl.
CPC ............... *H04R 27/00* (2013.01); *G08B 7/066* (2013.01); *H04L 12/1895* (2013.01); *G08B 1/00* (2013.01); *G08B 13/1672* (2013.01); *G08B 17/00* (2013.01); *G09G 1/00* (2013.01); *H04R 2227/003* (2013.01)

(58) Field of Classification Search
CPC .................................. G08B 1/00; G09G 1/00
See application file for complete search history.

(56) References Cited

U.S. PATENT DOCUMENTS

| | | | |
|---|---|---|---|
| 7,986,231 B1* | 7/2011 | Bentley | G08B 13/1672 340/540 |
| 2003/0128850 A1 | 7/2003 | Kimura et al. | |
| 2004/0088345 A1* | 5/2004 | Zellner | G06Q 50/24 709/200 |
| 2011/0095875 A1* | 4/2011 | Thyssen | G09G 5/10 340/407.1 |

FOREIGN PATENT DOCUMENTS

| | | |
|---|---|---|
| DE | 102007057664 | 6/2009 |
| WO | 2006034246 | 3/2006 |

OTHER PUBLICATIONS

EP Search Report related to EP Application 14192927.3, dated May 18, 2015 (6 pages).

* cited by examiner

*Primary Examiner* — Shirley Lu
(74) *Attorney, Agent, or Firm* — Brooks, Cameron & Huebsch, PLLC

(57) ABSTRACT

Devices, methods, and systems are described herein. One device includes a speaker component to broadcast a message, a microphone component to detect a sound, an IP component to receive the message using a communication path, and a computing component to determine a source of the detected sound.

19 Claims, 5 Drawing Sheets

INTERNET PROTOCOL ADDRESSABLE PUBLIC ADDRESS DEVICES AND SYSTEMS

TECHNICAL FIELD

The present disclosure relates to Internet protocol (IP) addressable public address (PA) devices, methods, and systems.

BACKGROUND

PA systems can be used during emergency situations to notify and/or evacuate people from an area. For instance, a number of speakers can be placed throughout an area, such as a building, that can broadcast a message (e.g., a sound and/or voice message indicating an emergency is occurring).

In some instances, an area can have a number of sub-portions, such as a number of zones. The PA system can include a number of speakers placed in each of the number of sub-portions of the area. In existing PA systems, speakers in a particular sub-portion can be activated (e.g., broadcast a message) while speakers in a different sub-portion are not. By selectively activating the speakers in the particular sub-portion, the PA system can address a situation that may affect people in the particular sub-portion. People in other sub-portions, in contrast, are not disrupted by a broadcast message related to a situation that may not affect them (e.g., a false positive warning). However, in some instances, a sub-portion of an area can be large enough that a broadcast message can be a false positive warning to at least some people located in the sub-portion of the area. Further, the broadcast message is a generic message broadcast by all speakers in the sub-portion and cannot be individualized.

DETAILED DESCRIPTION

Figure 1:
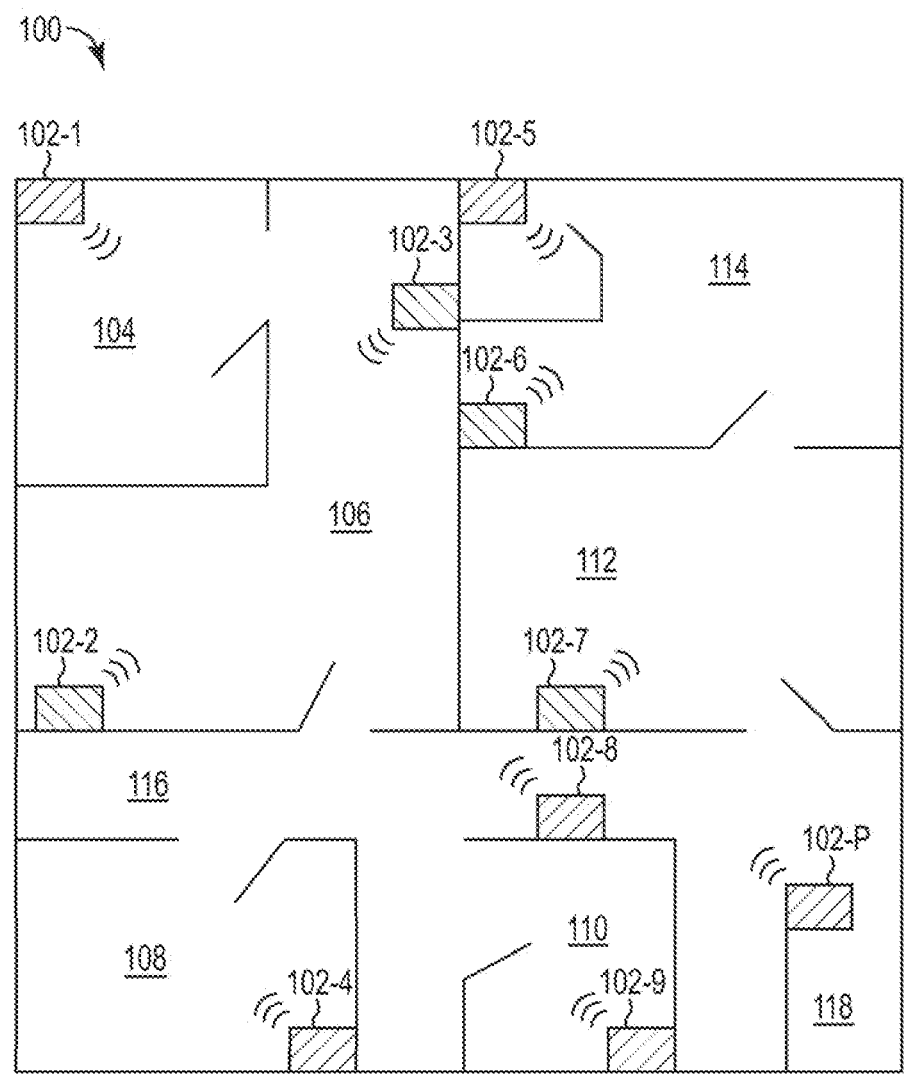
FIG. 1 illustrates an example of an area in accordance with one or more embodiments of the present disclosure.

IP addressable PA devices, methods, and systems are described herein. For example, one or more device embodiments can include a speaker component to broadcast a message, a microphone component to detect a sound, an IP component to receive the message using a communication path, and a computing component to determine a source of the detected sound.

As discussed herein, speakers of a PA system can be placed at various places in an area to distribute a message (e.g., sound) to people in the area. For example, the speakers can broadcast an alarm (e.g., a repeating sound) and/or a voice message (e.g., spoken message, such as "caution" or "evacuate the building", among other examples). Placement of the speakers can be important for proper distribution of the message to people in the area. In an example, a particular speaker can broadcast messages to people located in a particular sub-portion of the area (e.g., a room in a building, a building in a factory and/or industrial complex, etc.) A sub-portion of an area, as used herein, can include a defined segment of the area (e.g., different floors and/or wings of a building, different buildings of an industrial complex, different rooms of a building, etc.).

Speakers can be activated in groups based on sub-portions of the area (e.g., zones of a building, factory, industrial complex, etc.) By activating speakers in groups, a message can be broadcast to a sub-set of people in the area. In such an instance, false positive warnings and/or evacuations can be avoided. For example, an industrial complex can include multiple buildings. A fire located in a first building on a north side of the industrial complex may not affect a person located in a second building on a south side of the industrial complex. Currently available PA systems can activate speakers located in the first building to broadcast a message.

However, in some instances, it may be beneficial to activate individual speakers in a sub-portion of the area. For example, a sub-portion may be large enough that an event occurring may effect only a sub-set of people in the sub-portion. Therefore, individual speakers can be activated based on the location of the event. In other instances, it may be beneficial to send a particular message to a particular speaker. For example, directions to exit the area can be broadcast using multiple speakers. Current PA systems cannot send specialized messages. For instance, current PA systems broadcast the same message utilizing speakers in the sub-portion of the area.

In contrast, embodiments of the present disclosure include IP addressable PA devices, methods, and systems including individually addressable devices for providing context sensitive messages. For instance, IP addressable PA devices, in accordance with one or more embodiments, can be individually addressable utilizing wireless and/or wired IP technologies. In various instances, an IP addressable PA device can include an integrated microphone component enabling a richer set of functionalities as compared to currently available PA systems. For instance, the IP addressable PA devices can be used to determine an event is occurring using one or more sounds detected, receive context sensitive messages for evacuating people, and/or identify the presence of a person in the area, among other functionalities. For example, the identified presence can include localization of a position of a person in the area.

In various embodiments, a plurality of IP addressable PA devices can form an intelligent IP addressable PA device network that can identify and locate the position of persons in the area. The persons can include, for instance, emergency personal and/or trapped people in emergency situations. The position of a person can be determined, for example, using a plurality of IP addressable PA devices communicating to triangulate the location. Further, the system can guide the person in an evacuation process by multicasting context sensitive messages. Further, in some embodiments, the system can perform automatic volume control for intelligent measurements.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" refers to one or more. For example, "a number of nodes" can refer to one or more nodes. Additionally, the designator "P" and "N" as used herein, particularly with respect to reference numerals in the drawings, indicate that a number of the particular features so designed can be included with a number of embodiments of the present disclosure.

FIG. 1 illustrates an example of an area 100 in accordance with one or more embodiments of the present disclosure. As illustrated by the embodiment of FIG. 1, the area 100 can include a number of sub-portions 104, 106, 108, 110, 112, 114, 116, 118. A number of IP addressable PA devices 102-1, 102-2, 102-3, 102-4, 102-5, 102-6, 102-7, 102-8, 102-9 . . . 102-P (herein generally referred to as "IP addressable PA devices 102") can be located throughout the area 100.

Although the embodiment of FIG. 1 illustrates ten IP addressable PA addressable devices 102 and eight sub-portions 104, 106, 108, 110, 112, 114, 116, 118, embodiments in accordance with the present disclosure are not so limited. For instance, embodiments can include more or less than ten IP addressable PA devices and more or less than eight sub-portions of the area.

Furthermore, although the embodiment illustrates the area 100 as a single floor building with a number of rooms, embodiments in accordance with the present disclosure are not so limited. For example, embodiments can include a multi-floor building (e.g., a skyscraper), a multi-building factory and/or industrial complex, a school with multiple floors, an outdoor industrial complex (e.g., a utility plant), and/or an indoor and outdoor industrial complex, among other areas.

The location of the IP addressable PA devices 102 throughout the area 100 can be designed so that a message can be heard by people located in the various sub-portions 104, 106, 108, 110, 112, 114, 116, 118 of the area 100. One or more of the sub-portions (e.g., particular sub-portion 106) can be of a size that may use multiple IP addressable PA devices 102 (e.g., IP addressable PA devices 102-2 and 102-3) to assist in broadcasting a message throughout the entire sub-portion 106.

Each of the IP addressable PA devices 102 can include a speaker component, a microphone component, an IP component, and/or a computing component. A speaker component can include, for instance, an electroacoustic transducer that produces sound in response to an electrical audio signal input. For example, the speaker component can broadcast a message. A message, as used herein, can include a sound and/or voice message.

In various instances, the message can include a context sensitive message. A context sensitive message can include a message sent and/or determined based on the particular situation (e.g., a presence of a person, location of the person, type of event occurring, etc.) For instance, a context sensitive message can include information to guide a person to the particular location.

A microphone component can include, for instance, an acoustic-to-electric transducer and/or sensor that can convert sound into an electrical signal. The microphone component can detect a sound, for example. For instance, the microphone component can detect a sound from a person in the area 100, can detect a sound from another IP addressable PA device, and/or can detect a sound associated with an event (e.g., detect fire, as discussed further herein).

An IP component, as used herein, can include a component addressable by an IP address. IP is a communication protocol in the Internet protocol suite for relaying data across a network. The communication can include a wireless and/or wired communication, in various embodiments. The data can be delivered, for instance, as a data packet from a source to a destination (e.g., the IP component of an IP addressable PA device) solely based on an IP address in a header of the data packet. The data packet can include, for instance, a message. The message received can, for example, be broadcast using the speaker component of the particular IP addressable PA device.

A computing component, as used herein, can include hardware components and/or software components (e.g., a computer-readable medium in communication with one or more processing resources) to process detected sounds and/or data received. For instance, the computing component can determine a source of a detected sound. The computing component can include an integrated computing system, for example.

In various instances, the determination source can include an event. For instance, the determine source of the detected sound can include fire. Fire can be identified using the computing component and/or the microphone component to detect fire based on sound characteristics of fire.

The computing component, in various instances, can automatically broadcast a message in response to determining the source is fire. That is, the computing component can have one or more pre-defined messages stored on memory (e.g., a computer-readable medium).

In other instances, the computing component can send data to a computing system (e.g., an external computing system). The computing component can send the data wirelessly and/or using a wired connection. The computing system can include an offsite computing system (e.g., not in the area 100). The data sent can include the detected sound and/or the determined source, for example. The computing system can determine the source of the detected sound and/or verify the source and can send data back to the IP addressable PA device based on the determined source. The data sent back can include, for instance, a message to broadcast using the IP addressable PA device.

In a number of embodiments, the computing component of an IP addressable PA device for the computing system can determine the source of the detected sound is a person using voice recognition techniques. For instance, the computing component of the IP addressable PA device and/or the computing system can identify the presence of a person in the area 100 using the detected sound. The computing component and/or microphone component of the IP addressable PA device can be activated to identify the presence of a person in response to an event occurring in the area 100. The person can include a particular person and/or a general detection of the presence of a person, as discussed further herein.

The event can include, for instance, an emergency event, such as an evacuation event (e.g., fire, tornado, suspicious person/activity occurring, among other events). The event, in various instances, can be determined as occurring using the IP addressable PA device and/or by receiving data from an external source. For instance, a first IP addressable PA device 102-1 can determine that an event is occurring in the area 100. The first IP addressable PA device 102-1 may determine the event is occurring based on a detected sound (e.g., fire).

Alternatively and/or in addition, data can be received (e.g., wirelessly and/or using a wired communication) from one or more external sources and the first IP addressable PA device 102-1 may determine an event is occurring based on the data. In various instances, the external source can send at least a sub-set of the IP addressable PA devices 102 the data and/or the first IP addressable PA device 102-1 can communicate the data and/or determined event to the at least sub-set of IP addressable PA devices 102 in the PA system (e.g., wirelessly and/or using a wired communication).

In a number of embodiments, the IP addressable PA devices 102 can self-adjust a volume of a speaker component of an individual IP addressable PA device. For instance, the microphone component of a first IP addressable PA device 102-1 can detect a confidence measurement from a broadcast message made using the speaker component of the first IP addressable PA device 102-1. The confidence measurement can include a detected sound from broadcasting the message (e.g., broadcast using the first IP addressable PA device 102-1). Using the confidence measurement, the computing component can automatically adjust a volume of the speaker component.

For example, the confidence measurement can be adjusted to 15 decibels (dB) above a level of sound in the area 100. In some instances, regulations may state that a message broadcast from an emergency system (e.g., an IP addressable PA device) should be at least 15 dB above the level of sound in the area 100. This is sometimes referred to as a "signal-to-noise ratio" and, in this particular example, the signal-to-noise ratio should be 15 dB. In response to the confidence measurement being below a signal-to-noise ratio of 15 dB, the volume level of the speaker component can be adjusted. The adjustment can include, for instance, adjusting the volume level to at least 15 dB above the level of sound in the area 100. A confidence measurement below a signal-to-noise ratio of 15 dB can include a confidence measurement that is less than 15 dB above the level of sound in the area 100.

In some embodiments, the self-adjustment of the volume of the particular IP addressable PA device (e.g., the first IP addressable PA device 102-1) may utilize feedback from a different IP addressable PA device (e.g., the third IP addressable PA device 102-3). The feedback can include a confidence measurement and/or signal-to-noise ratio measured and communicated to the particular IP addressable device. For example, a third IP addressable PA device 102-3 may measure a confidence measurement of a message broadcast using the first IP addressable PA device 102-1. The third IP addressable PA device 102-3 can communicate the measured confidence measurement. The communication can include a wireless and/or wired communication, for instance. The communicated measurement can, for instance, include the signal-to-noise ratio of the message broadcast using the first IP addressable PA device 102-1. In response to the confidence measurement being less than 15 dB above the level of sound in the area 100, the first IP addressable PA device 102-1 can adjust a volume of the speaker component.

Alternatively and/or in addition, the above described process for self-adjustment of a volume of the speaker component can be used to identify a non-working individual IP addressable PA device. For example, the microphone component of the first IP addressable PA device 102-1 may not detect a confidence measurement from a broadcast message made using the speaker component of the first IP addressable PA device 102-1. In response to not detecting a confidence measurement (e.g., not detecting sound from the broadcast message), the first IP addressable PA device 102-1 can be identified as a non-working IP addressable PA device.

In various embodiments, the IP addressable PA device can be used to monitor a volume level in the area 100. For instance, the microphone component of a first IP addressable PA device 102-1 can detect a sound associated with the area 100. The computing component of the first IP addressable PA device 102-1 and/or a computing system can identify, using the detected sound, a volume level occurring in the area 100 at the period of time. The volume level can be recorded, for instance, to comply with regulations and/or relevant laws (e.g., maximum volume levels).

One or more IP addressable PA devices 102 can be used, in accordance with some embodiments of the present disclosure, to acoustically adjust a quality of sound of a first IP addressable PA device 102-1. For example, a microphone component of a second IP addressable PA device 102-3 can detect a confidence measurement from a broadcast message made using the speaker component of the first IP addressable PA device 102-1. The second IP addressable PA device 102-3 can send data (e.g., a data packet) to the first IP addressable PA device 102-1 to acoustically adjust the sound quality of the speaker component and/or can send the detected confidence measurement to a computing system to determine how to acoustically adjust the sound quality. The data can be sent wirelessly (e.g., using the IP address), for instance. The computing system, in such instances, can determine the acoustic adjustment and communicate with the first IP addressable PA device 102-1.

In various instances, one or more IP addressable PA devices 102 can identify the presence of one or more people in the area 100 and guide the people to a particular location (e.g., to safety). For example, a first IP addressable PA device 102-1 can identify the presence of a person and broadcast a first message to the person. The first message can include a direction to the person on how and/or where to move to. For instance, the first message can include "evacuate to the stairs."

In addition and/or alternatively, the first message can include a specific direction, such as "exit the bathroom (e.g., sub-portion 104) and the conference room (e.g., sub-portion 106) to the stair case (e.g., sub-portion 118)", among other messages. The IP addressable PA devices 102 the person passes and/or nears along the way to the particular location (e.g., IP addressable PA devices 102-3, 102-2, 102-8, and 102-P) can replay the first message to guide the user to the particular location (e.g., the stairway 118).

In some embodiments, one or more IP addressable PA devices 102 can be used to guide the person to the particular location. For example, a first IP addressable PA device 102-1 can identify the presence of a person and broadcast a first message to the user. A second IP addressable PA device 102-3 can identify the subsequent presence of the person and broadcast a second message to the user. A third IP addressable PA device 102-8 can identify the subsequent presence of the person and broadcast a third message to the user. For example, the first message can include "exit the bathroom through the door on the west wall", the second message can include "go south towards the door to exit the conference room", and the third voice message can include "head west down the hallway to the staircase on the right."

Although the present example illustrates an evacuation of a person to a staircase using three voice messages, embodiments in accordance with the present disclosure are not so limited. For instance, the guidance can be to a safe room and/or evacuating out of the area 100. The number of messages used can include fewer or greater than three and/or can include a variety of messages (e.g., sounds, voice messages, lights, etc.), in accordance with embodiments of the present disclosure.

Further, in various embodiments, subsequent identification of a presence of the person may not occur. For example, a first IP addressable PA device 102-1 can identify the presence of a person and broadcast a first message to the user. The second IP addressable PA device 102-3 and the third IP addressable PA device 102-8 can broadcast the second message and the third message, respectively, at a predetermined period of time and/or repetitively.

Figure 2:
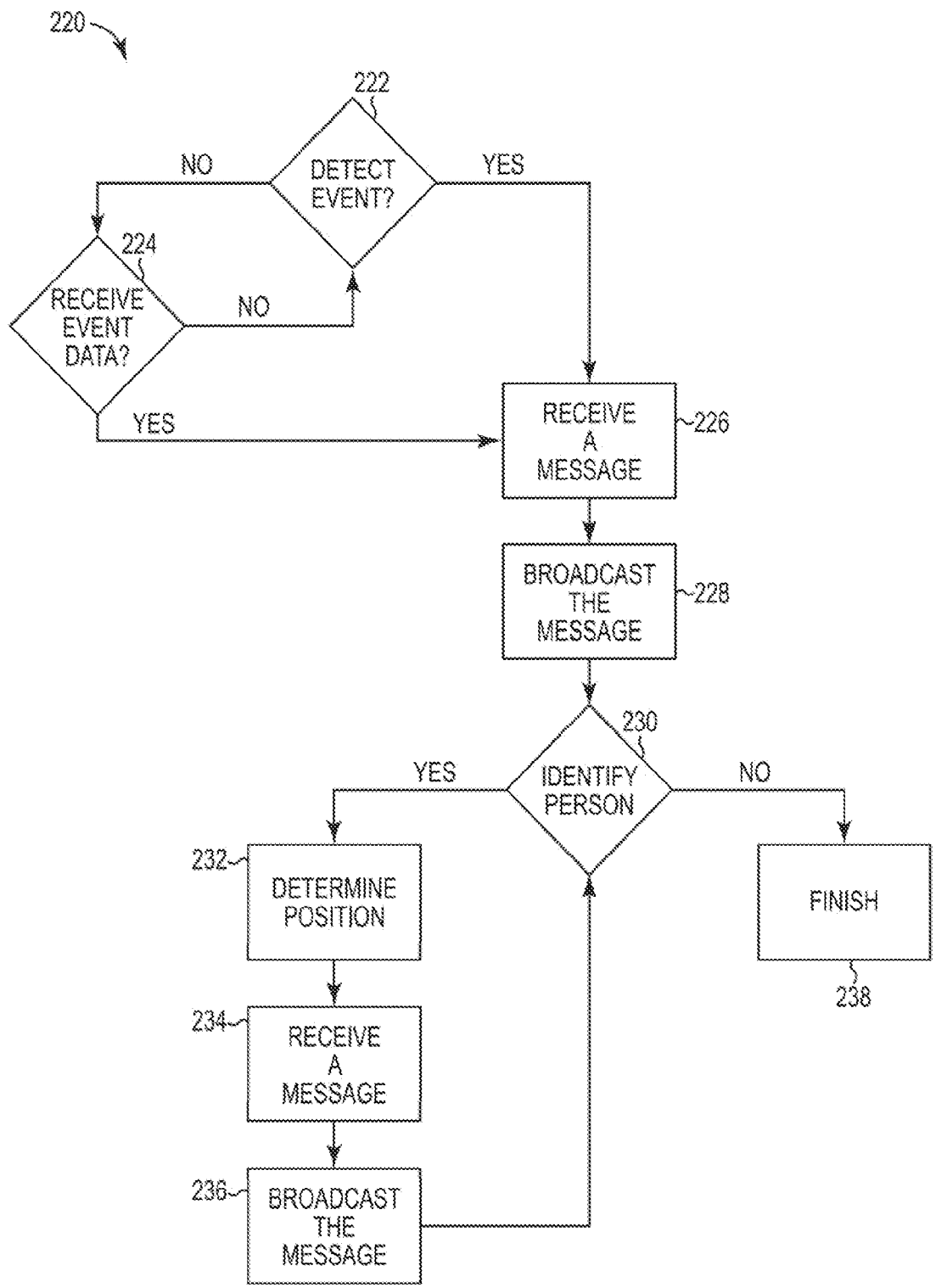
FIG. 2 illustrates a flow diagram of an example of a process for sound based localization with an IP addressable PA system in accordance with one or more embodiments of the present disclosure.

FIG. 2 illustrates a flow diagram of an example of a process 220 for sound based localization with an IP addressable PA system in accordance with one or more embodiments of the present disclosure. The process 220 can utilize one or more IP addressable PA devices of an IP addressable PA system to guide a person located in an area to a particular location.

The particular location can be inside the area and/or outside the area depending on an event that is occurring. For example, during a fire event, people located in the area may be evacuated outside the area to safety. During a weather event and/or suspicious person (e.g., gunman), people may be guided to a safe sub-portion of the area (e.g., a weather safe room, a room with a lock on the door, etc.)

A determination can be made, at block 222, whether an event is detected using one or more IP addressable PA devices. An event can be detected using an IP addressable PA device by detecting sounds in the area. A source of the detected sound can be determined and/or communicated using the IP addressable PA device. The communication can include a wireless and/or wired communication, for instance.

In response to not detecting an event using an IF addressable PA device, at block 224, a determination can be made as to whether event data has been received. Event data can include, for instance, notification of an event occurring. The event data can be wirelessly communicated from an external source, for instance. An external source can include a device outside the IP addressable PA system, such as separate sensors, computing systems, and/or security systems, among other devices.

In response to detecting an event and/or receiving event data, at block 226, a message can be received. The message can be a first message and/or an event notification message (e.g., notify people present in the area of an event), in various instances. The message can include a statement and/or sound to be broadcast using one or more IP addressable PA devices in the IP addressable PA system. The message can be received, for instance, from memory of a computing component of the particular IP addressable PA device and/or from a computing system.

For example, a computing system can selectively send the message to a particular IP addressable PA device based on event data. The message can be sent wirelessly and/or using a wired communication. In various instances, a sub-set of the plurality of IP addressable PA devices can selectively receive the message based on a location of the event. The event data can be received from an IP addressable PA device (e.g., a first IP addressable PA device detects an event) and/or an external sources (e.g., a security system, fire system, a weather source), for example. Based on the location of the event, the sub-set of the plurality of IP addressable PA devices can be identified.

At block 228, the IP addressable PA device can broadcast the message. Broadcasting the message can include playing the message (e.g., producing sound) using a speaker component of the IP addressable PA device.

A determination can be made, at block 230, whether a presence of a person is identified by the IP addressable PA device. The IP addressable PA device can, in various instances, identify the presence of a person subsequent to a first message (e.g., an event notification message).

The identification of the presence of a person can be based on voice recognition techniques. Voice recognition techniques, as used herein, can include deciphering spoken words and/or sound said by a person and converting the spoken words and/or sound into a device recognizable message.

In accordance with some embodiments of the present disclosure, voice identification techniques (VID) can be used to recognize a particular person. VID can, for instance, recognize a person that is speaking. For example, the identification can include identification of a particular person. Some areas may be dangerous and/or have security concerns, such that knowledge of a particular person in the presence of an event may be desirable. That is, a particular person can be recognized and the particular person can be identified as in the presence of an IP addressable PA device.

In response to identifying a person, at block 232, a location (e.g., position) of the person can be determined. The location can be, for instance, based on a location of the IP addressable PA device that identified the presence of the person. In some instances, the location can be determined using the sound detected using the IP addressable PA device (e.g., triangulation techniques and/or time of flight (TOF) techniques).

At block 234, a message can be received at one or more IP addressable PA devices in response to the determined position of the person. The message can include a second message to guide the person to a particular location. The message can be received wirelessly, for instance. At block 236, the message can be broadcast using the one or more IP addressable PA devices.

In various embodiments, the identification of the presence of the person at block 230, the determination of the position of the person at block 232, the receipt of a message at block 234, and the broadcast of the message 236 can be repeated until the person is guided and/or detected at the particular location. The message can include a single repeated message and/or multiple context sensitive messages. A context sensitive message can include a message sent and/or determine based on the particular situation (e.g., a person presence, location of the person, type of event occurring, etc.) For instance, a context sensitive message can include information to guide a person to the particular location.

In response to not identifying the presence of a person, at 238, the process 220 can be complete. In various instances, not identifying the presence of a person can include identifying the person at the particular location (e.g., a safe location) using an IP addressable PA device and/or receiving data identifying that the person is safe from an external source.

Figure 3:
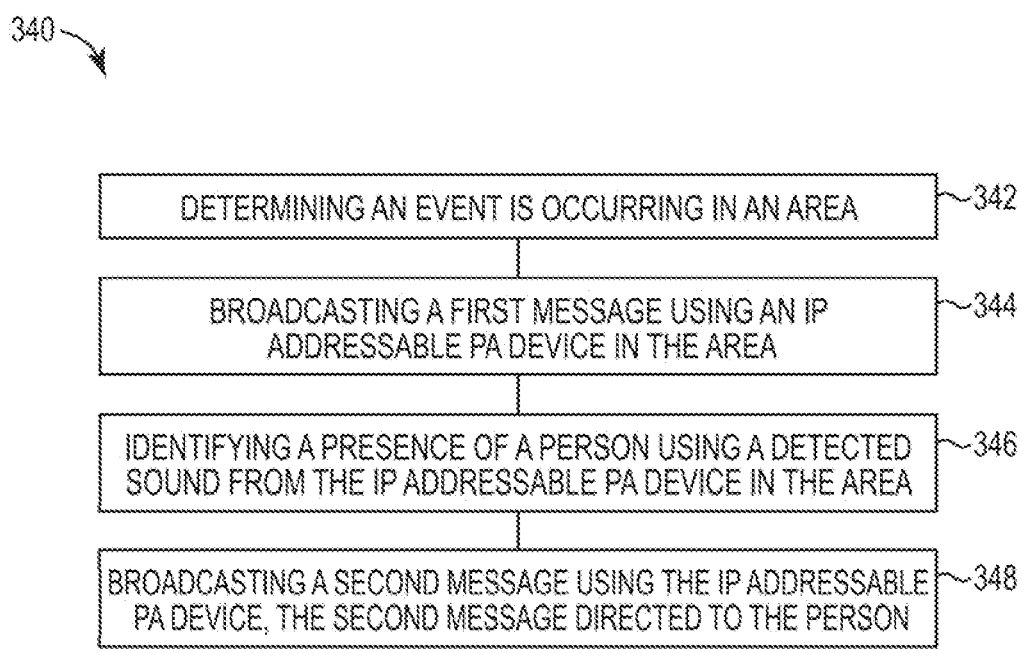
FIG. 3 illustrates an example of a method for broadcasting a message using an IP addressable PA device in accordance with one or more embodiments of the present disclosure.

FIG. 3 illustrates an example of a method 340 for broadcasting a message using an IP addressable PA device in accordance with one or more embodiments of the present disclosure. The method 340 can be performed by a computing component of an IP addressable PA device and/or by a computing system external to the area of the PA system, for example.

At block 342, the method 340 can include determining an event is occurring in an area. The determination can be made using an IP addressable PA device and/or based on event data from an external source, for instance.

At block 344, the method 340 can include broadcasting a first message using an IP addressable PA device in the area. The first message can be broadcast in response to the determined event, for instance. The first message can be retrieved from memory of the IP addressable PA device, in some embodiments.

In various embodiments, the method 340 can include receiving a first set of data including the first message at the IP addressable PA device in the area. The first set of data can include, for instance, a data packet sent (e.g., wirelessly and/or wired) to an IP address associated with the IP addressable PA device. The IP addressable PA device can receive the first set of data in response to a determination that the IP addressable PA device is proximate to the event occurring. The first set of data can be sent from an external source (e.g., a computing system), for instance.

The first message can include an event notification message, for example. An event notification message can include a voice message and/or sound indicating an event is occurring. For instance, an event notification message can include "Fire", "Please Evacuate", "Evacuate in an Orderly Fashion", "Please Stay Away from Particular Location X", and/or "Potentially Dangerous Situation, Please Proceed to Particular Location X", among other messages.

At block 346, the method 340 can include identifying a presence of a person using a detected sound from the IP addressable PA device (e.g., captured by) in the area. The identification can include identifying a particular person and/or a live human is located in the area. The identification can be based on voice recognition techniques. For example, the IP addressable PA device can be trained to recognize particular spoken phrases (e.g., "Help", "I am trapped"), and/or human sounds (e.g., crying, screaming, heavy breathing, etc.)

At block 348, the method 340 can include broadcasting a second message using the IP addressable PA device, the second message directed to the person. The second message can be retrieved from memory of the IP addressable PA device, in some embodiments.

In various embodiments, the method 340 can include receiving a second set of data at the IP addressable PA device including the second message directed to the identified person. The second message can, for instance, include a voice message that when broadcast can assist in guiding the person to a particular location (e.g., to safety). The second set of data can be sent (e.g., wirelessly and/or wired) from an external source (e.g., a computing system), for example.

Figure 4:
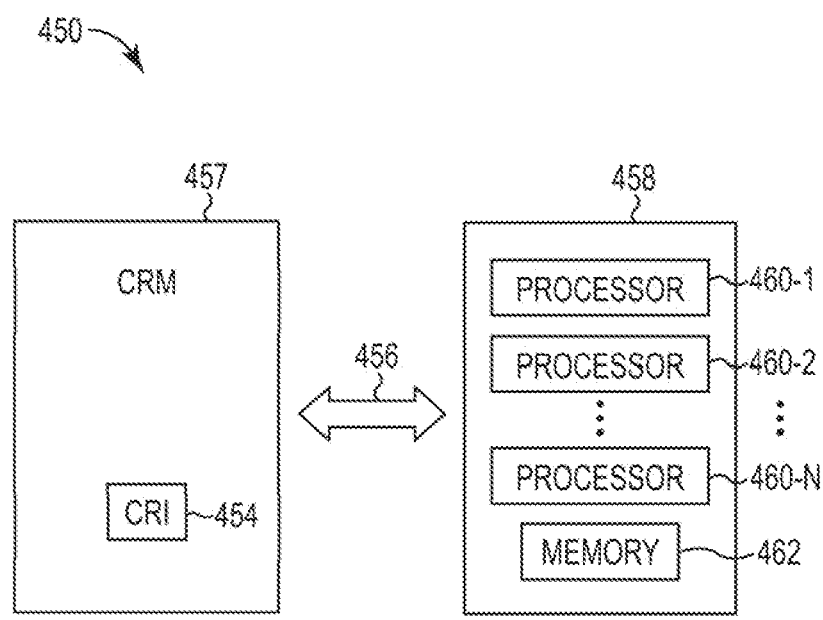
FIG. 4 illustrates a block diagram of an example of a computing system in accordance with one or more embodiments of the present disclosure.

FIG. 4 illustrates a block diagram of an example of a computing system 450 in accordance with one or more embodiments of the present disclosure. As shown in the embodiment of FIG. 4, the system 450 includes a computer-readable medium (CRM) 457 in communication with processing resources 460-1, 460-2 . . . 460-N.

CRM 457 can be in communication with a device 458 (e.g., a Java® application server, a mobile device, among others) having processing resources 460-1, 460-2 . . . 460-N. The device 458 can be in communication with a tangible non-transitory CRM 457 storing a set of computer-readable instructions (CRI) 454 executable by one or more of the processing resources 460-1, 460-2 . . . 460-N, as described herein. The CRI 454 can also be stored in remote memory managed by a server and represent an installation package that can be downloaded, installed, and executed. The device 458 can include the memory resource 462, and the processing resources 460-1, 460-2 . . . 460-N can be coupled to the memory resource 462.

Processing resources 460-1, 460-2 . . . 460-N can execute CRI 454 that can be stored on an internal or external non-transitory CRM 457. The processing resources 460-1, 460-2 . . . 460-N can execute CRI 454 to perform various functions. For example, the processing resources 460-1, 460-2 . . . 460-N can execute CRI 454 to selectively send a message to an IP addressable PA device among the plurality of IP addressable PA devices using a communication path.

A non-transitory CRM (e.g., CRM 457), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 457 can also include distributed storage media. For example, the CRM 457 can be distributed among various locations.

The non-transitory CRM 457 can be integral, or communicatively coupled, to a computing device, in a wired and/or a wireless manner. For example, the non-transitory CRM 457 can be an internal memory, a portable memory, a portable disk, or a memory associated with another computing resource (e.g., enabling CRIs to be transferred and/or executed across a network such as the Internet).

The CRM 457 can be in communication with the processing resources 460-1, 460-2 . . . 460-N via a communication path 456. The communication path 456 can be local or remote to a machine (e.g., a computer) associated with the processing resources 460-1, 460-2 . . . 460-N. Examples of a local communication path 456 can include an electronic bus internal to a machine (e.g., a computer) where the CRM 457 is one of volatile, non-volatile, fixed, and/or removable storage medium in communication with the processing resources 460-1, 460-2 . . . 460-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 456 can be such that the CRM 457 is remote from the processing resources e.g., 460-1, 460-2 . . . 460-N such as in a network relationship between the CRM 457 and the processing resources (e.g., 460-1, 460-2 . . . 460-N). That is, the communication path 456 can be a network relationship. Examples of such a network relationship can include a local area network (LAN), wide area network (WAN), personal area network (PAN), and the Internet, among others. In such examples, the CRM 457 can be associated with a first computing device and the processing resources 460-1, 460-2 . . . 460-N can be associated with a second computing device (e.g., a Java® server, a mobile device, etc.). For example, a processing resource 460-1, 460-2 . . . 460-N can be in communication with a CRM 457, wherein the CRM 457 includes a set of instructions and wherein the processing resource 460-1, 460-2 . . . 460-N is designed to carry out the set of instructions to selectively send a message to an IP addressable PA device among the plurality of IP addressable PA devices using a communication path. The communication path can include a wireless communication, for instance.

The computing system can include a sub-portion of an IP addressable PA system, in various instances. The IP addressable PA system can include a plurality of IP addressable PA devices and/or the computing system. The computing system can be, for instance, offsite from a location of the plurality of IP addressable PA devices (e.g., offsite from the area).

Each IP addressable PA device can include a speaker component, an IP component, and/or a microphone component, for instance. A speaker component can be used to broadcast one or more messages. An IP component can be used to receive data over a communication path (e.g., wirelessly and/or wired using an individual IP address). For instance, the computing system can communicate with each IP addressable PA device using the IP component of each IP addressable PA device. The microphone component can be used to detect sound.

In various instances, each IP addressable PA device can include a computing component (e.g., an integrated computing system). The computing component can include a processing resource coupled to a memory resource (e.g., a microchip) for processing received data, detected sounds, and/or to instruct the IP addressable PA device to broadcast a message.

The computing system can be configured to process data from one or more IP addressable PA devices. Processing resources 460-1, 460-2 . . . 460-N coupled to the memory resource 462 can selectively send a first message to an IP addressable PA device among the plurality of IP addressable PA devices using a communication path (e.g., a wireless and/or wired communication). In various instances, the first message can be sent to a sub-set of the plurality of devices. Each device can have a unique IP address, for example. The IP addressable PA device and/or the sub-set of IP addressable PA devices can be determined to have the first message sent based on a location of an event occurring in the area. The first message can include, for instance, an event notification message.

In various instances, the determination of the location of the event can be based on event data sent from the one and/or a sub-set of IP addressable PA devices identifying the occurrence of an event. Alternatively and/or in addition, the location of the event can be determined using event data from an external source.

The processing resources 460-1, 460-2 . . . 460-N coupled to the memory resource 462 can identify a presence of a person using a detected sound from the microphone component of the IP addressable PA device. The identification can be processed by the computing system and/or by the IP addressable PA device, in various instances. For example, each IP addressable PA device can include a computing component to identify a source of a detected sound and communicate the source to the computing system.

Further, the processing resources 460-1, 460-2 . . . 460-N coupled to the memory resource 462 can send a second message to the IP addressable PA device in response to the identification of the presence of the person using the communication path. The second message can include a context sensitive message, for instance.

In some embodiments, the message can include a first message and the processing resources 460-1, 460-2 . . . 460-N coupled to the memory resource 462 can instruct a speaker component of a different IP addressable PA device to broadcast a second message in response to an identification of a presence of the person in proximity to the different IP addressable PA device. For instance, the first message and the second message can include instructions to guide the person to safety.

In various embodiments of the present disclosure, the computing system can include one or more input devices. A user may enter commands and information into the computing system through the input devices. Example input devices can include a keyboard, mouse and/or other point device, touch screen, microphone, joystick, game pad, scanner, etc. The input devices can be connected to the system through an interface, such as a parallel port, game port, or a universal serial bus (USB). A monitor or other type of display device can also be connected to the system via an interface, such as a video adapter. The monitor can display graphical user information for the user.

Any of the above information, data, and/or images can be saved along with the plurality of images as metadata and/or a data file which can be available for later image processing and/or other purposes.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Figure 5:
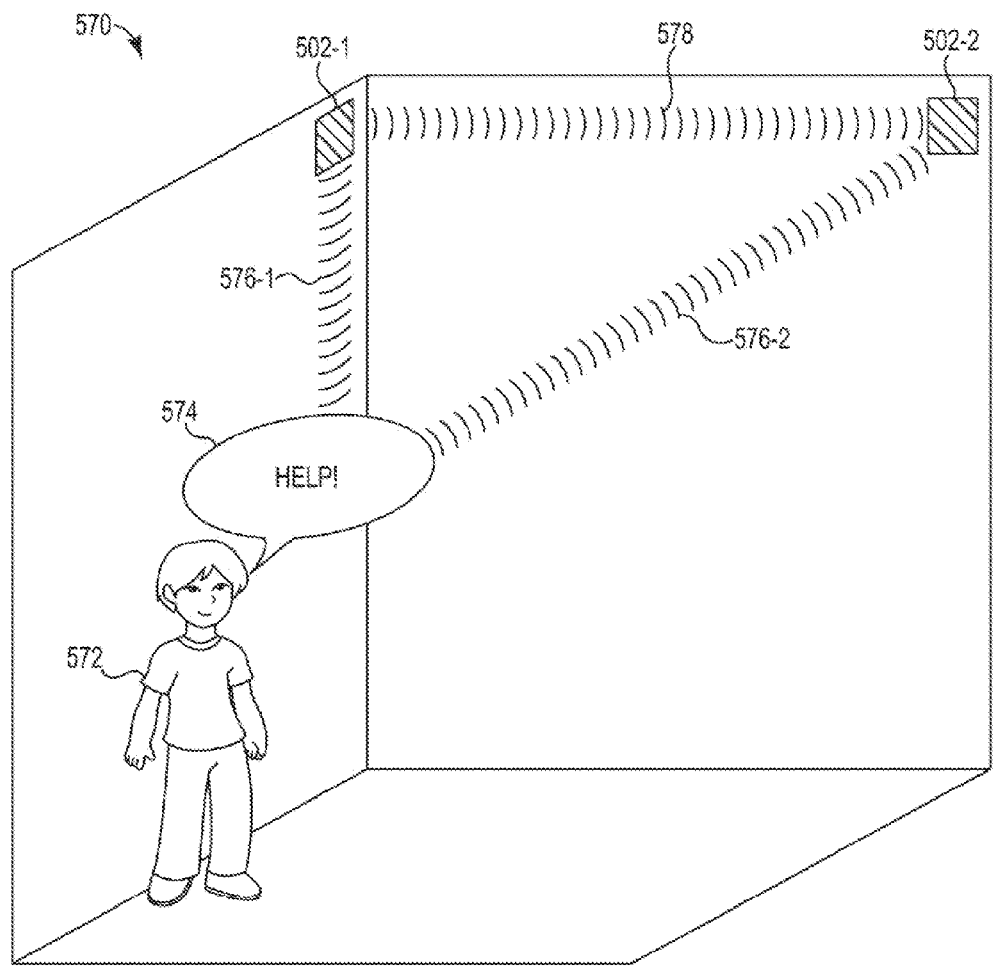
FIG. 5 illustrates an example of a process for determining a source of a detected sound using an IP addressable PA system in accordance with one or more embodiments of the present disclosure.

FIG. 5 illustrates an example of a process 570 for determining a source of a detected sound using an IP addressable PA system in accordance with one or more embodiments of the present disclosure. For instance, the process 570 can be used to determine a source is a person 572 and/or is fire based on sound characteristics of fire.

As illustrated by the embodiment of FIG. 5, one or more IP addressable PA devices 502-1, 502-2 can be located in an area. One or more of the IP addressable PA devices 502-1, 502-2 can be used to determine a source of a detected sound 576-1, 576-2. For example, a first IP addressable PA device 502-1 can detect a sound 576-1 using a microphone component of the first IP addressable PA device 502-1.

A computing component of the first IP addressable PA device 502-1 can determine the source of the detect sound. For instance, the computing component can determine the source is a person 572. The sound detected 576-1 from the person 572 can include spoken words 574 (e.g., "Help!"). The source can be determined, for instance, using voice recognition techniques. That is, determining the source can include identifying a presence of the person 572 using a detected sound 576-1 from spoken words 574 of the person 572.

In accordance with some embodiments, identifying the presence of the person 572 can include determining a location of the person 572 using a plurality of IP addressable PA device 502-1, 502-1. For instance, the identified presence can include localization of a position of a person 572 in the area.

The location of a person 572 can be determined, for example, using a first IP addressable PA device 502-1 and a second IP addressable PA device 502-2 communicating 578 to triangulate the location. The communication 578 can include a wireless communication, in various embodiments. For example, the first IP addressable PA device 502-1 and the second IP addressable PA device 502-1 can detect a sound 576-1, 576-2 from the person 572. The detected sound 576-1, 576-2 can include sound waves from spoken words 574 from the person 572.

Although the embodiment of FIG. 5 illustrates separate detected sounds 576-1, 576-2 (e.g., sound waves) traveling to the first IP addressable PA device 502-1 and the second IP addressable PA device 502-2, the detected sound can be from the same spoken words 574. That is, the detected sounds can include sound waves from the spoken words 574 of the person 572 that may be measured by the first IP addressable PA device 502-1 and the second IP addressable PA device 502-2 at different times based on the distance of the devices 502-1, 502-2 from the person 572.

The location of each IP addressable PA device 502-1, 502-2 and/or the distance between each IP addressable PA device 502-1, 502-2 can be known. The locations can be used, in various embodiments, to locate the person 572 in the area. For example, the first IP addressable PA device 502-1 can communicate 578 with the second IP addressable PA device 502-2 to triangulate the location of the person 572.

Alternatively and/or in addition, time of flight (TOF) techniques can be utilized to determine the location of the person 572. TOF techniques can include comparison of a measurement of time that it takes for sound waves from a detected sound to reach each IP addressable PA device 502-1, 502-2. For example, triangulating the location of the person 572 can utilize the known locations of the IP addressable PA devices 502-1, 502-2 and TOF of the detected sounds 576-1, 576-2 from the spoken words 574 reaching each IP addressable PA device 502-1, 502-2. Using the measurements and known locations, the location of the person 572 can be determined.

Although the embodiment of FIG. 5 illustrates determining a presence of a person, embodiments in accordance with the present disclosure are not so limited. For example, the source of the detected sound can include fire and can be determined based on sound characteristics of fire. The location of the fire can be determined, for instance, using a plurality of IP addressable PA device 502-1, 502-1 communicating to triangulate the position of the fire using triangulation and/or TOF techniques.

Further, although the embodiment of FIG. 5 illustrates two IP addressable PA devices, embodiments in accordance with the present disclosure are not so limited. For example, the number of IP addressable PA devices in an area can include more or fewer than two devices.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An internet protocol (IP) addressable public assistance (PA) device, comprising:
   a microphone component to detect a sound;
   a computing component to analyze the detected sound to determine a source of the detected sound, wherein the computing component sends data, including the detected sound and the determined source, to a computing system that is configured to process data from an IP addressable PA device in response to detecting an event;
   an IP component to receive a message using a communication path, wherein the message is formulated by the computing system; and
   a speaker component to broadcast a message, wherein the message includes a sound and/or voice message.

2. The device of claim 1, wherein the computing component is configured to:
   determine the source of the detected sound is fire based on sound characteristics of fire; and
   in response to determining the source is fire, instruct the speaker component to broadcast the message.

3. The device of claim 1, wherein the computing component is configured to:
   determine the source of the detected sound is a person; and
   in response to determining the source is the person, instruct the speaker component to broadcast a second message.

4. The device of claim 1, wherein the computing component is configured to determine the source of the detected sound is a particular person using voice recognition techniques.

5. The device of claim 1, wherein the microphone component detects a confidence measurement from the broadcast of the message using the speaker component of the IP addressable PA device.

6. The device of claim 5, wherein the computing component automatically adjusts a volume of the speaker component based on the confidence measurement.

7. A method for broadcasting a message using an internet protocol (IP) addressable public address (PA) device, including:
   determining an event is occurring in an area;
   broadcasting a first voice message using an IP addressable PA device in the area;
   identifying a presence of a person using a detected sound from the IP addressable PA device in the area; and
   broadcasting a second voice message using the IP addressable PA device, the second message directed to the person.

8. The method of claim 7, including adjusting a volume level of a speaker component of the IP addressable PA device based on a volume level of the speaker component detected using a microphone component of the IP addressable PA device.

9. The method of claim 8, wherein adjusting the volume level includes automatically adjusting the volume level to at least 15 decibels above a level of sound in the area.

10. The method of claim 7, including detecting a volume level occurring in the area at a period of time using the IP addressable PA device.

11. The method of claim 7, wherein identifying the presence of the person includes identifying a variety of locations of the person using a plurality of IP addressable PA devices.

12. The method of claim 11, wherein broadcasting the second message includes broadcasting a plurality of second messages, wherein each of the plurality of second messages is broadcasted using one of the plurality of IP PA addressable devices as the person is identified in proximity to the IP addressable PA device.

13. The method of claim 11, wherein broadcasting the second message includes broadcasting a plurality of second messages at predetermined period of times.

14. An internet protocol (IP) addressable public address (PA) system, comprising:
    a plurality of IP addressable PA devices, each of the plurality devices comprising:
        a speaker component to broadcast voice messages;
        an IP component to receive data over a communication path; and
        a microphone component to detect sound; and
    a computing system configured to:
        selectively send a first voice message to an IP addressable PA device among the plurality of IP addressable PA devices using the communication path;
        identify a presence of a person using a detected sound from the microphone component of the IP addressable PA device; and
        send a second voice message to the IP addressable PA device in response to the identification of the presence of the person using the communication path.

15. The system of claim 14, wherein each IP addressable PA device includes a computing component to identify sources of detected sounds and communicate the sources to the computing system.

16. The system of claim 14, wherein the computing system is configured to acoustically adjust a quality of sound of a speaker component of a first IP addressable PA device among the plurality using at least a second IP addressable PA device among the plurality.

17. The system of claim 14, wherein the plurality of IP addressable PA devices further identify the person is within proximity to an IP addressable PA device and guide the person to a location using multiple messages.

18. The system of claim 14, wherein the computing system sends a third message to a different IP addressable PA device in response to an identification of a presence of the person in proximity to the different IP addressable PA device.

19. The system of claim 18, wherein the second message and the third message include instructions to guide the person to safety.

* * * * *